(12) United States Patent
Wilkerson et al.

(10) Patent No.: US 10,414,107 B2
(45) Date of Patent: Sep. 17, 2019

(54) METHOD AND MATERIAL EFFICIENT TOOLING FOR CONTINUOUS COMPRESSION MOLDING

(71) Applicant: The Boeing Company, Chicago, IL (US)

(72) Inventors: Randall D. Wilkerson, O'Fallon, MO (US); James R. Fox, University City, MO (US); Alexander M. Rubin, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/831,388

(22) Filed: Dec. 4, 2017

(65) Prior Publication Data

US 2018/0154596 A1    Jun. 7, 2018

Related U.S. Application Data

(60) Continuation of application No. 13/934,884, filed on Jul. 3, 2013, now abandoned, which is a division of
(Continued)

(51) Int. Cl.
| | |
|---|---|
| B29C 43/14 | (2006.01) |
| B29C 70/42 | (2006.01) |
| B29D 7/01 | (2006.01) |
| B29C 43/22 | (2006.01) |
| B29C 70/52 | (2006.01) |

(Continued)

(52) U.S. Cl.
CPC .............. *B29D 7/01* (2013.01); *B29C 43/14* (2013.01); *B29C 43/22* (2013.01); *B29C 43/228* (2013.01); *B29C 70/42* (2013.01); *B29C 70/526* (2013.01); *B29C 70/54* (2013.01); *B29K 2105/08* (2013.01); *Y10T 156/101* (2015.01); *Y10T 156/1737* (2015.01)

(58) Field of Classification Search
CPC ........ B29C 2043/046; B29C 2043/142; B29C 70/42; B29C 70/46
See application file for complete search history.

(56) References Cited

U.S. PATENT DOCUMENTS

| | | | |
|---|---|---|---|
| 2,708,288 A | 5/1955 | Fuller et al. | |
| 4,061,817 A | 12/1977 | Maxel | |

(Continued)

FOREIGN PATENT DOCUMENTS

| | | |
|---|---|---|
| BE | 834458 A1 | 2/1976 |
| DE | 1504302 A1 | 4/1969 |

(Continued)

OTHER PUBLICATIONS

International Search Report dated Oct. 23, 2007, regarding Application No. PCT/US2007/003021, 3 pages.
(Continued)

*Primary Examiner* — William P Bell
(74) *Attorney, Agent, or Firm* — Yee & Associates, P.C.

(57) ABSTRACT

Thermoplastic laminates are fabricated in a continuous compression molding production line. A lay-up of laminate plies is placed in a recess on a carrying tool, and the tool is moved through successive forming operations on the line, including preforming and consolidation operations. The tool is separated from the fully formed part at the end of the line and may be reused. Use of the carrying tool reduces material scrap.

24 Claims, 3 Drawing Sheets

Related U.S. Application Data application No. 11/701,789, filed on Feb. 3, 2007, now Pat. No. 8,491,745.

(51) Int. Cl.
  *B29C 70/54* (2006.01)
  *B29K 105/08* (2006.01)

(56) References Cited

U.S. PATENT DOCUMENTS

| | | |
|---|---|---|
| 4,151,031 A | 4/1979 | Goad et al. |
| 4,225,553 A | 9/1980 | Hirota et al. |
| 4,414,266 A | 11/1983 | Lubowitz et al. |
| 4,414,269 A | 11/1983 | Lubowitz et al. |
| 2,440,228 A | 4/1984 | Yardeny et al. |
| 4,462,946 A | 7/1984 | Goldsworthy |
| 4,571,355 A | 2/1986 | Elrod |
| 4,608,220 A | 8/1986 | Caldwell et al. |
| 4,674,712 A | 6/1987 | Whitener et al. |
| 4,749,613 A | 6/1988 | Yamada et al. |
| 4,759,815 A | 7/1988 | Frey |
| 4,818,460 A | 4/1989 | Nied |
| 4,859,267 A | 8/1989 | Knoll |
| 4,913,910 A | 4/1990 | McCarville et al. |
| 4,944,824 A | 7/1990 | Gupta |
| 4,970,044 A | 11/1990 | Kim et al. |
| 4,980,013 A | 12/1990 | Lowery |
| 5,021,283 A | 6/1991 | Takenaka et al. |
| 5,026,447 A | 6/1991 | O'Connor |
| 5,026,514 A | 6/1991 | Hauwiller et al. |
| 5,043,128 A | 8/1991 | Umeda |
| 5,057,175 A | 10/1991 | Ashton |
| 5,064,439 A | 11/1991 | Chang et al. |
| 5,139,407 A | 8/1992 | Kim et al. |
| 5,182,060 A | 1/1993 | Berecz |
| 5,192,330 A | 3/1993 | Chang et al. |
| 5,192,383 A | 3/1993 | Cavin |
| 5,320,700 A | 6/1994 | Hall et al. |
| 5,413,472 A | 5/1995 | Dietterich et al. |
| 5,681,513 A | 10/1997 | Farley |
| 5,716,487 A | 2/1998 | Sumerak |
| 5,759,325 A | 6/1998 | Davis |
| 5,820,804 A | 10/1998 | Elmaleh |
| 5,958,550 A | 9/1999 | Childress |
| 6,007,917 A | 12/1999 | Weigel et al. |
| 6,024,555 A | 2/2000 | Goodridge et al. |
| 6,114,012 A | 9/2000 | Amaoka et al. |
| 6,162,314 A | 12/2000 | Kassuelke et al. |
| 6,291,049 B1 | 9/2001 | Kunkel et al. |
| 6,319,346 B1 | 11/2001 | Clark et al. |
| 6,425,969 B1 | 7/2002 | van den Akker |
| 6,689,448 B2 | 2/2004 | George et al. |
| 6,696,009 B2 | 2/2004 | Davis |
| 6,764,057 B2 | 7/2004 | Fanucci et al. |
| 6,869,558 B2 | 3/2005 | Polk, Jr. et al. |
| 7,186,361 B2 | 3/2007 | Kasai et al. |
| 7,191,982 B2 | 3/2007 | Vetillard et al. |
| 7,300,693 B2 | 11/2007 | Albers et al. |
| 7,419,372 B2 | 9/2008 | Kasai et al. |
| 7,431,875 B2 | 10/2008 | Rule |
| 7,513,769 B2 | 4/2009 | Benson et al. |
| 7,670,525 B2 | 3/2010 | Weidmann et al. |
| 7,807,005 B2 | 10/2010 | Rubin et al. |
| 7,871,553 B2 | 1/2011 | Wilkerson et al. |
| 8,151,529 B2 | 4/2012 | Weidmann et al. |
| 8,163,221 B2 | 4/2012 | Suzuki et al. |
| 8,333,858 B2 | 12/2012 | Rubin et al. |
| 8,337,654 B2 | 12/2012 | Schmier, II et al. |
| 8,425,708 B2 | 4/2013 | Rubin et al. |
| 2002/0088549 A1 | 7/2002 | Fanucci et al. |
| 2002/0135093 A1 | 9/2002 | Davis |
| 2003/0044570 A1 | 3/2003 | George et al. |
| 2003/0168555 A1 | 9/2003 | Livi et al. |
| 2003/0175520 A1 | 9/2003 | Grutta et al. |
| 2003/0232176 A1 | 12/2003 | Polk, Jr. et al. |
| 2004/0009338 A1 | 1/2004 | Jo et al. |
| 2004/0096535 A1 | 5/2004 | Hudeck et al. |
| 2005/0029707 A1 | 2/2005 | Kasai et al. |
| 2005/0053765 A1 | 3/2005 | Albers et al. |
| 2005/0056362 A1 | 3/2005 | Benson et al. |
| 2005/0252603 A1 | 11/2005 | Rule |
| 2006/0011289 A1 | 1/2006 | Suriano |
| 2006/0083806 A1 | 4/2006 | Kasai et al. |
| 2006/0216480 A1 | 9/2006 | Weidmann et al. |
| 2006/0226288 A1 | 10/2006 | Vetillard et al. |
| 2006/0249868 A1 | 11/2006 | Brown et al. |
| 2007/0012858 A1 | 1/2007 | Callis |
| 2007/0175571 A1 | 8/2007 | Rubin et al. |
| 2007/0175572 A1 | 8/2007 | Rubin et al. |
| 2007/0175573 A1 | 8/2007 | Fox et al. |
| 2007/0175575 A1 | 8/2007 | Rubin et al. |
| 2008/0168619 A1 | 7/2008 | Gonzalez et al. |
| 2008/0185756 A1 | 8/2008 | Wilkerson et al. |
| 2008/0277058 A1 | 11/2008 | Schmier, II et al. |
| 2009/0065977 A1 | 3/2009 | Suzuki et al. |
| 2009/0074905 A1 | 3/2009 | Matsen et al. |
| 2009/0078362 A1 | 3/2009 | Wilkerson et al. |
| 2010/0148005 A1 | 6/2010 | Weidmann et al. |
| 2010/0225016 A1 | 9/2010 | Prebil et al. |
| 2010/0319841 A1 | 12/2010 | Rubin et al. |
| 2011/0206906 A1 | 8/2011 | Rubin et al. |
| 2012/0175049 A1 | 7/2012 | Suzuki et al. |
| 2013/0126076 A1 | 5/2013 | Rubin et al. |
| 2013/0202871 A1 | 8/2013 | Hidaka et al. |
| 2014/0014274 A1 | 1/2014 | Wilkerson et al. |
| 2015/0053333 A1 | 2/2015 | Prebil et al. |

FOREIGN PATENT DOCUMENTS

| | | |
|---|---|---|
| DE | 1629830 A1 | 1/1971 |
| DE | 2165470 A1 | 7/1973 |
| DE | 2647821 A1 | 4/1978 |
| DE | 3709480 A1 | 10/1988 |
| DE | 4017978 A1 | 12/1991 |
| DE | 29711917 U1 | 8/1997 |
| EP | 0024895 A2 | 3/1981 |
| EP | 0277727 A1 | 8/1988 |
| EP | 0317861 A2 | 5/1989 |
| EP | 1336469 A1 | 8/2003 |
| EP | 1504880 A1 | 2/2005 |
| EP | 1614624 A1 | 1/2006 |
| EP | 1666353 A1 | 6/2006 |
| EP | 1813404 A2 | 8/2007 |
| EP | 1995040 A1 | 11/2008 |
| EP | 2014448 A2 | 1/2009 |
| FR | 2384604 A1 | 10/1978 |
| FR | 2587649 A1 | 3/1987 |
| FR | 2888155 A1 | 1/2007 |
| GB | 531357 A | 1/1941 |
| GB | 1157239 A | 7/1969 |
| JP | 2007001298 A | 1/2007 |
| WO | WO8302085 A1 | 6/1983 |
| WO | WO8810186 A1 | 12/1988 |
| WO | WO2007092371 A2 | 8/2007 |
| WO | WO2008073164 A2 | 6/2008 |
| WO | WO2008094227 A1 | 8/2008 |
| WO | WO2008097847 A1 | 8/2008 |
| WO | WO2010101744 A2 | 9/2010 |
| WO | WO2011106117 A1 | 9/2011 |

OTHER PUBLICATIONS

International Search Report dated Oct. 27, 2008, regarding Application No. PCT/US2007/018611, 3 pages.

International Search Report dated Mar. 31, 2008, regarding Application No. PCT/US2007/022234, 3 pages.

International Search Report dated Jul. 17, 2008, regarding Application No. PCT/US2008/052806, 2 pages.

International Search Report dated Oct. 28, 2010, regarding Application No. PCT/US2010/025176, 5 pages.

International Search Report dated Apr. 28, 2011, regarding Application No. PCT/US2011/022003, 3 pages.

(56) References Cited

OTHER PUBLICATIONS

European Patent Office Communication, dated Aug. 9, 2011, regarding Application No. EP08728832.0, 5 pages.
Canadian Intellectual Property Office Communication, dated Jul. 22, 2014, regarding Application No. 2,673,448, 2 pages.
Notices of Reasons for Rejection and English Translation, dated Jul. 14, 2015, regarding Japanese Patent Application No. 2012-555007, 5 pages.
Canadian Intellectual Property Office Communication, dated Apr. 4, 2017, regarding Application No. 2,790,614, 3 pages.
Cai et al., "Consolidation Techniques and Cure Control," In: Handbook of Composites, Second Edition, Peters (Ed.), Chapman & Hall, London, 1998, pp. 576-577.
Loos et al., "Thermoplastic Composite Sheet Forming," presented at National Science Foundation Workshop on Composite Sheet Forming, Sep. 2001, 11 pages. Retrieved Apr. 4, 2012, from http://www.mech.northwestern.edu/fac/cao/nsfworkshop/presentations/ns7_loos.pdf.
Office Action, dated Mar. 12, 2009, regarding U.S. Appl. No. 11/347,122, 17 pages.
Office Action, dated Nov. 23, 2009, regarding U.S. Appl. No. 11/347,122, 9 pages.
Final Office Action, dated Jun. 24, 2010, regarding U.S. Appl. No. 11/347,122, 12 pages.
Notice of Allowance, dated Jul. 21, 2010, regarding U.S. Appl. No. 11/347,122, 6 pages.
Office Action, dated Apr. 15, 2010, regarding U.S. Appl. No. 11/697,378, 28 pages.
Final Office Action, dated Oct. 27, 2010, regarding U.S. Appl. No. 11/697,378, 20 pages.
Office Action, dated Jul. 27, 2011, regarding U.S. Appl. No. 11/697,378, 19 pages.
Final Office Action, dated Mar. 2, 2012, regarding U.S. Appl. No. 11/697,378, 7 pages.
Office Action, dated Jun. 18, 2012, regarding U.S. Appl. No. 11/697,378, 20 pages.
Final Office Action, dated Sep. 19, 2012, regarding U.S. Appl. No. 11/697,378, 10 pages.
Notice of Allowance, dated Dec. 24, 2012, regarding U.S. Appl. No. 11/697,378, 11 pages.
Office Action, dated Feb. 4, 2010, regarding U.S. Appl. No. 11/584,923, 16 pages.
Final Office Action, dated Jul. 13, 2010, regarding U.S. Appl. No. 11/584,923, 12 pages.
Office Action, dated Jul. 27, 2011, regarding U.S. Appl. No. 11/584,923, 10 pages.
Final Office Action, dated Apr. 16, 2012, regarding U.S. Appl. No. 11/584,923, 9 pages.
Notice of Allowance, dated Jul. 25, 2012, regarding U.S. Appl. No. 11/584,923, 19 pages.
Office Action, dated Feb. 2, 2010, regarding U.S. Appl. No. 11/699,653, 16 pages.
Final Office Action, dated Jul. 16, 2010, regarding U.S. Appl. No. 11/699,653, 11 pages.
Office Action, dated Feb. 16, 2011, regarding U.S. Appl. No. 11/699,653, 13 pages.
Final Office Action, dated Jul. 7, 2011, regarding U.S. Appl. No. 11/699,653, 14 pages.
Office Action, dated Feb. 14, 2014, regarding U.S. Appl. No. 11/699,653, 43 pages.
Notice of allowance, dated Mar. 27, 2015, regarding U.S. Appl. No. 11/699,653, 22 pages.
Office Action, dated Oct. 1, 2009, regarding U.S. Appl. No. 11/701,789, 18 pages.
Final Office Action, dated Mar. 25, 2010, regarding U.S. Appl. No. 11/701,789, 15 pages.
Office Action, dated Jun. 21, 2010, regarding U.S. Appl. No. 11/701,789, 11 pages.
Final Office Action, dated Dec. 29, 2010, regarding U.S. Appl. No. 11/701,789, 14 pages.
Office Action, dated Apr. 20, 2011, regarding U.S. Appl. No. 11/701,789, 15 pages.
Final Office Action, dated Oct. 12, 2011, regarding U.S. Appl. No. 11/701,789, 17 pages.
Office Action, dated Jul. 5, 2012, regarding U.S. Appl. No. 11/701,789, 30 pages.
Final Office Action, dated Dec. 13, 2012, regarding U.S. Appl. No. 11/701,789, 9 pages.
Notice of Allowance, dated Mar. 22, 2013, regarding U.S. Appl. No. 11/701,789, 22 pages.
Office Action dated Mar. 4, 2015, regarding U.S. Appl. No. 13/934,884, 35 pages.
Final Office Action dated Jul. 10, 2015, regarding U.S. Appl. No. 13/934,884, 17 pages.
Office Action, dated Jan. 22, 2014, regarding U.S. Appl. No. 13/673,989, 30 pages.
Final Office Action, dated Mar. 27, 2014, regarding U.S. Appl. No. 13/673,989, 12 pages.
Office Action, dated Jun. 6, 2014, regarding U.S. Appl. No. 13/673,989, 11 pages.
Final Office Action, dated Jan. 2, 2015, regarding U.S. Appl. No. 13/673,989, 19 pages.
Office Action, dated May 6, 2016, regarding U.S. Appl. No. 13/673,989, 20 pages.
Notice of Allowance, dated Jul. 7, 2016, regarding U.S. Appl. No. 13/673,989, 9 pages.
Office Action, dated Sep. 11, 2009, regarding U.S. Appl. No. 11/859,057, 11 pages.
Final Office Action, dated Mar. 23, 2010, regarding U.S. Appl. No. 11/859,057, 10 pages.
Notice of Allowance, dated Oct. 4, 2010, regarding U.S. Appl. No. 11/859,057, 9 pages.
Office Action, dated Jan. 24, 2011, regarding U.S. Appl. No. 12/398,071, 15 pages.
Final Office Action, dated Jun. 8, 2011, regarding U.S. Appl. No. 12/398,071, 9 pages.
Office Action, dated Feb. 20, 2013, regarding U.S. Appl. No. 12/398,071, 24 pages.
Final Office Action, dated Jul. 19, 2013, regarding U.S. Appl. No. 12/398,071, 13 pages.
Notice of Allowance, dated Nov. 20, 2013, regarding U.S. Appl. No. 12/398,071, 9 pages.
Office Action, dated Jun. 25, 2015, regarding U.S. Appl. No. 14/182,215, 34 pages.
Final Office Action, dated Oct. 19, 2015, regarding U.S. Appl. No. 14/182,215, 12 pages.
Notice of Allowance, dated Sep. 8, 2016, regarding U.S. Appl. No. 14/182,215, 15 pages.
Office Action, dated Dec. 16, 2011, regarding U.S. Appl. No. 12/711,401, 22 pages.
Final Office Action, dated Jun. 15, 2012, regarding U.S. Appl. No. 12/711,401, 33 pages.
Office Action, dated Jan. 18, 2013 regarding U.S. Appl. No. 12/711,401, 32 pages.
Final Office Action, dated Jul. 1, 2013, regarding U.S. Appl. No. 12/711,401, 33 pages.
Office Action, dated Sep. 6, 2016, regarding U.S. Appl. No. 12/711,401, 27 pages.
Final Office Action, dated Feb. 9, 2017, regarding U.S. Appl. No. 12/711,401, 28 pages.
Office Action, dated Jun. 13, 2017, regarding U.S. Appl. No. 12/711,401, 14 pages.
Final Office Action, dated Nov. 20, 2017, regarding U.S. Appl. No. 12/711,401, 34 pages.
Office Action, dated Jul. 18, 2014, regarding U.S. Appl. No. 13/419,187, 44 pages.
Final Office Action, dated Aug. 25, 2015, regarding U.S. Appl. No. 13/419,187, 21 pages.
Office Action, dated Nov. 21, 2016, regardsing U.S. Appl. No. 13/419,187, 31 pages.
Office Action, dated Nov. 22, 2017, regarding U.S. Appl. No. 13/419,187, 13 pages.

(56) References Cited

OTHER PUBLICATIONS

Office Action, dated Oct. 2, 2017, regarding U.S. Appl. No. 14/538,977, 14 pages.
Office Action, dated Mar. 4, 2016, regarding U.S. Appl. No. 14/602,699, 48 pages.
Final Office Action, dated Aug. 8, 2016, regarding U.S. Appl. No. 14/602,699, 17 pages.
Office Action, dated Dec. 29, 2016, regarding U.S. Appl. No. 14/602,699, 18 pages.
Final Office Action, dated Jun. 8, 2017, regarding U.S. Appl. No. 14/602,699, 20 pages.
Office Action, dated Jan. 26, 2018, regarding U.S. Appl. No. 14/602,699, 26 pages.
Final Office Action, dated Mar. 15, 2018, regarding U.S. Appl. No. 13/419,187, 26 pages.
Office Action, dated May 24, 2018, regarding U.S. Appl. No. 12/711,401, 35 pages.
Final Office Action, dated Apr. 19, 2018, regarding U.S. Appl. No. 14/538,977, 21 pages.
Final Office Action, dated Jul. 9, 2009, regarding U.S. Appl. No. 11/347,122, 8 pages.
Prebil et al., "Method for Fabricating Tapered Thermoplastic Composite Parts," filed Mar. 13, 2012, U.S. Appl. No. 13/419,187, 67 pages.

DIRECTION OF MATERIAL FLOW

METHOD AND MATERIAL EFFICIENT TOOLING FOR CONTINUOUS COMPRESSION MOLDING

This application is a continuation application of U.S. application Ser. No. 13/934,884, filed Jul. 3, 2013, which is a divisional application of U.S. application Ser. No. 11/701,789, filed Feb. 3, 2007, and issued U.S. Pat. No. 8,491,745 on Jul. 23, 2013.

TECHNICAL FIELD

This disclosure generally relates to processes and equipment for continuous compression molding of composite thermoplastic laminates, and deals more particularly with a continuous compression molding method and related tooling that reduces the amount of material required to manufacture the laminates.

BACKGROUND

Continuous compression molding (CCM) is a process used to fabricate thermoplastic composite (TPC) laminates in continuous lengths. One CCM process is described in German Patent Application DE 4017978 C2, published Sep. 30, 1993. This process is capable of producing TPCs of various shapes and sizes in a semi-continuous manner. Long or continuous lengths of laminate plies are fed through a pre-forming operation where the plies are shaped into a continuous pre-form which is then passed through a consolidation operation. The consolidation operation includes a continuously operating compression press which forces the plies together and consolidates them into the final shape of the part.

One disadvantage of the CCM process described above is material waste at the leading and trailing ends of each production run. This waste is a result of the position of the advance unit in relation to the starting point of the consolidation process, as well as the need to maintain a consistent gap in the press for proper alignment. The waste is commonly the shape of the part profile and may have a typical length of 6 to 8 feet, for example in some applications. This amount of waste may not be considered as significant in large production runs or production runs using less expensive materials. However, in the case of production runs that use more expensive materials, or relatively short production runs, the material waste may comprise a substantial amount of the cost of producing the parts.

Accordingly, there is a need for a method and related tooling that reduces the material waste. Embodiments of the disclosure are directed toward satisfying this need.

SUMMARY

In accordance with an embodiment of the disclosure, tooling is provided for use in continuous process for forming thermoplastic laminate parts using a lay-up of laminate plies. The tooling may include a rigid body having first and second ends. The body may include a recessed area in which the part is received. The first and second ends of the rigid body extend beyond the recess and also the ends of the part. The tooling body forms a carrier used to move the part through successive operations in the continuous forming process. The recess defines first and second shoulders in the body for respectively engaging opposite ends of the part to prevent movement of the part relative to the tooling body. The depth of the recess is substantially equal to the thickness of the consolidated part so that the exterior surfaces of the tooling body and the part form a continuous profile along the length of the tool body. In one application, without limitation, the tooling body may be generally U-shaped in cross section.

According to another embodiment, tooling is provided for carrying a lay-up of laminate plies through a continuous compression molding line for producing a part. The tooling may comprise an elongated body having opposite first and second ends, and at least one recess in the body for receiving the lay-up. The first and second ends of the body extend respectively beyond the opposite ends of the lay-up and have outside surfaces forming an extension of the profile of the part when the lay-up is compressed into the shape of the part. The recess may be formed along the length of the body, between the first and second body ends. The depth of the recess may be substantially equal to the thickness of the part. The outside surfaces of the body are substantially coplanar with the exterior surfaces of the part so that the combination of the body and the part form a continuous smooth profile.

According to another embodiment, a method is provided for fabricating a thermoplastic laminate part using a continuous compression molding line. The method includes the steps of placing a laminate lay-up in a recess formed in a tool, and moving the tool through the molding line. The method may further include the steps of passing the tool through a pre-forming operation, shaping the lay-up into a preformed part, passing the tool through a consolidation operation, consolidating the preformed part, and removing the part from the tool after the part has been consolidated.

A still further embodiment of the disclosure provides a method for fabricating a composite material part, comprising the steps of: supporting a lay-up of composite material on a tool; moving the tool through a continuous compression molding line; shaping the lay-up into a preformed part; consolidating the preformed part; and, removing the part from the tool after the preformed part has been consolidated.

These and further features, aspects and advantages of the embodiments will become better understood with reference to the following illustrations, description and claims.

BRIEF DESCRIPTION OF THE ILLUSTRATIONS

DETAILED DESCRIPTION

Embodiments of the disclosure provide material efficient tooling for forming thermoplastic composite (TPC) laminates and laminated parts using continuous compression molding (CCM) techniques. As will be described below in more detail, the laminates and laminate parts can be fabricated in a continuous process with reduced scrap material. The embodiments of the disclosure may be employed in a wide range of applications, and are especially suited for forming TPC stiffened members used in aircraft applications which may include, without limitation, fuselage skins, wing skins, control surfaces, door panels and access panels, keel beams, floor beams and deck beams. Various part cross section geometries can be fabricated including, without limitation, I-sections, Z-sections, U-sections, T-sections, etc. These parts may have uniform or non-uniform thicknesses, and can be either curved or straight along their length.

The basic process for forming TPC parts of the type described above are disclosed in U.S. patent application Ser. No. 11/347,122, filed Feb. 2, 2006, U.S. patent application Ser. No. 11/584,923, filed Oct. 20, 2006, and German Patent Application DE 4017978 C2, published Sep. 30, 1993. The entire disclosure of each of which are incorporated by reference herein.

Figure 1:
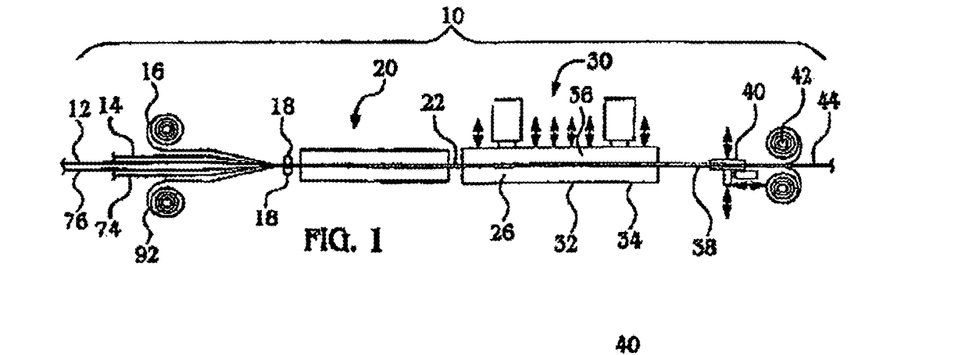
FIG. 1 is a diagrammatic illustration of a continuous compression molding line for fabricating thermoplastic composite parts.

Referring to FIG. 1, a CCM fabrication line 10 broadly may include a pre-forming zone 20, and a consolidation station 30. Multiple plies 12, 14 of composite materials are supplied either from continuous rolls (not shown) or in the form of tacked stacks (not shown) of precut blanks. The plies 12, 14 of composite material are fed along with sheet members forming mandrels 16, 92 to the pre-forming zone 20. Guides 18 or other tooling elements may be used to pre-align and guide the plies 12, 14 along with mandrels 16, as well as optional filler materials (not shown) into the pre-forming zone 20. The preformed material plies 12, 14 and mandrels 16 may be passed through an oven (not shown) to elevate the temperature of the ply materials in order to facilitate the pre-forming operations at preforming zone 20. Various features such as part flanges (not shown), for example, may be preformed in the pre-forming zone 20 using pressure applied to the plies 12, 14 using rollers 18 or other forming tools.

The preformed part 22, which has the general shape of the final part, exits the pre-forming zone 20 and moves into the consolidating operation 30. The consolidating operation 30 includes a plurality of standardized tool dies generally indicated at 36, that are individually mated with tool members (not shown) which have smooth outer surfaces engaged by the standardized dies, and inner surfaces that have tooled features. These tooled features are imparted to the preformed part 22 during the consolidation process. The commonality of the surfaces between the standardized dies 36 and the outer surfaces of the tool members eliminates the need for part-specific matched dies.

The consolidating operation 30 includes a pulsating drive mechanism 40 that moves the preformed part 22 forward within the consolidating operation 30 and away from the pre-forming zone 20, in continuous, incremental steps. As the preformed part 22 moves forward, the preformed part 22 first enters a heating zone 26 that heats the preformed part 22 to a temperature which allows the free flow of the polymeric component of the matrix resin in the plies 12, 14.

Next, the preformed part 22 moves forward into a pressing zone or operation 32 wherein standardized dies 36 are brought down collectively or individually at predefined pressures sufficient to compress and consolidate (i.e. allow free-flow of the matrix resin) the various plies 12, 14 into the desired shape and thickness. As the dies 36 are opened, the preformed part 22 is incrementally advanced within the consolidation operation 30, following which the dies 36 are closed again, causing successive sections of the part 22 to be compressed within different temperature zones, and thereby consolidate the laminate plies in the compressed section. This process is repeated for each temperature zone of the die 36 as the part 22 is incrementally advanced through the consolidation operation 30.

The fully formed and compressed (consolidated) part 22 then enters a cooling zone 34 which is separated from the pressing zone 32, wherein the temperature is brought below the free-flowing temperature of the matrix resin in the plies 12, 14, thereby causing the fused or consolidated part 22 to harden to its ultimate pressed shape. The consolidated and cooled part 38 then exits the consolidating operation 30, where the mandrels 16 are taken up on rollers 42. The final formed TPC part 44 is removed at the end of the line 10.

Although a CCM process has been described above for purposes of illustration, it should be noted that other molding processes may be used, including, but not limited to pultrusion or roll forming.

Figure 2:
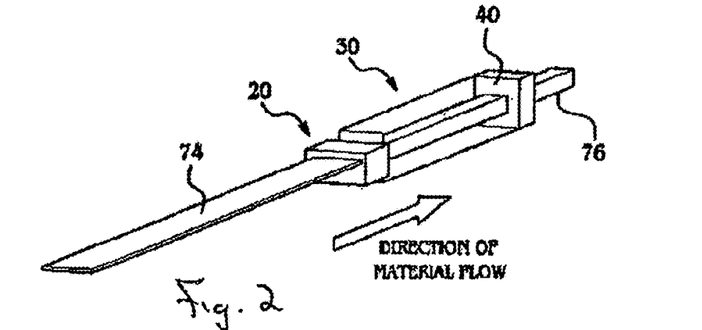
FIG. 2 is a simplified, perspective illustration of the molding line shown in FIG. 1.

FIG. 2 is a simplified view of the CCM line 10 shown in FIG. 1 in which a plurality of tacked plies 74 are advanced incrementally through the pre-forming zone 20 and the consolidating operation 30. Movement of the tacked plies 74 is caused by the pulsating drive mechanism 40 which effectively grabs the end 83, shown in FIG. 3, of the finished, fully formed part 76 as it exits the consolidating operation 30.

Figure 3:
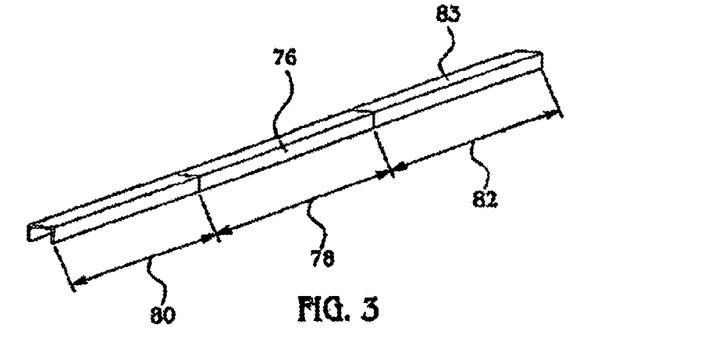
FIG. 3 is a perspective illustration of a thermoplastic composite part before scrap material has been cut away from the part.
Figure 4:
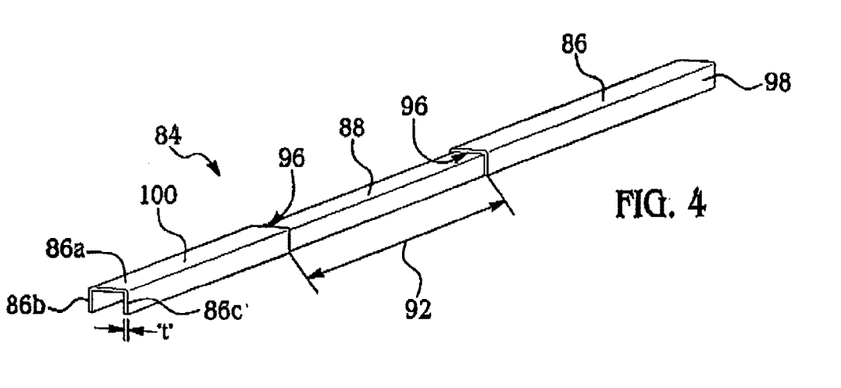
FIG. 4 is a perspective illustration of tooling according to an embodiment that may be used in the molding line shown in FIGS. 1 and 2.
Figure 5:
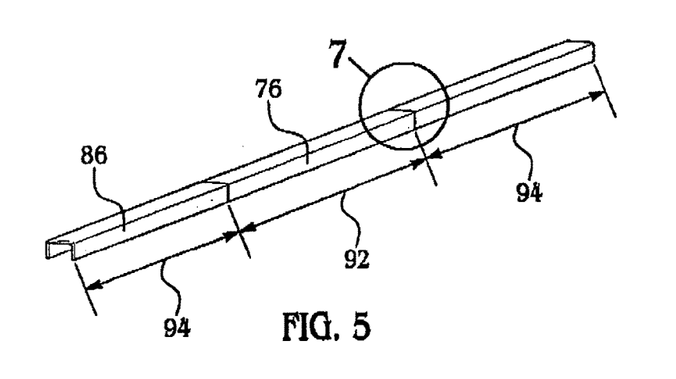
FIG. 5 is a view similar to FIG. 4 but showing a part held within a recess in the tooling.

At the end of a production run, some amount of the ply materials 74 are excess because portions of the ply materials 74 remain within the CCM line 10 when production is terminated. This excess material is illustrated in FIG. 3, wherein the finished part 76 has a finished length 78 with connected links of excess material designated as scrap 80, 82 respectively on the trailing and leading ends of the finished length 78. The primary reason for the scrap 82 on the leading end of the part 76 is due to the fact that the pulsating drive mechanism 40 extends beyond the consolidating zone 30, and a length of the fully formed part 76 must be advanced beyond the consolidating zone 30 before the pulsating drive mechanism 40 can grasp the end of the part 76. The distance between the pulsating drive mechanism 40 and the end of the consolidating operation 30 therefore corresponds to the length of the scrap 82 at the leading end of the part 76.

The primary cause for the scrap 80 on the trailing end of the part 76 is a result of the need to maintain a constant gap throughout the length of the presses in the consolidating operations 30. More particularly, is necessary to have the press elements (not shown) in the consolidating operation 30 applying constant pressure on the part 76 until the part 76 has completely exited the consolidating operations 30. Otherwise, unequal pressure may be applied by press platens to the end of the part 76 during the consolidation process which could deform portions of the part 76 or result in uneven pressures being applied during the consolidation process.

As previously discussed, the length of the scrap 80, 82 at the end of a production run may not be significant where the materials being used are inexpensive or where the production runs are high volume, however in the case of the use of expensive materials or short production runs, the cost of the scrap 80, 82 may be significant. In accordance with the disclosed embodiments, this scrap may be eliminated using tooling 84 shown in FIGS. 4-7.

In the illustrated example, the finished part 76 is U-shaped in cross section (FIG. 3) and has a uniform wall thickness throughout its length. The tooling 84 includes a tool body 86 having a central section 92, and leading and trailing ends 98, 100 respectively on opposite ends of the central section 92.

Figure 7:
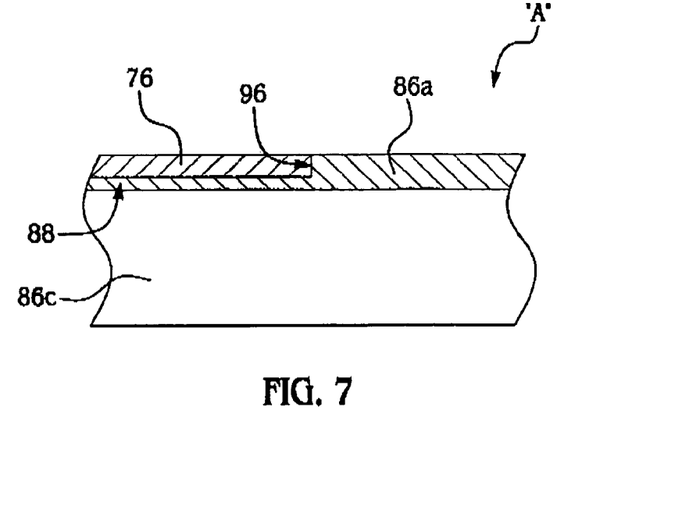
FIG. 7 is a side view illustration of the area designated as "A" in FIG. 6.

The tool body 86 has a U-shaped cross section defined by a top wall 86a and side walls 86b, 86c which possess a thickness "t". The central section 92 of tool body 86 has a reduced wall thickness defining a recess 88 in the outer surface of all three walls 86a, 86b, 86c. As best seen in FIG. 7, the depth of the recess 88 is substantially equal to the wall thickness of the part 76 so that the outer surface of the part 76 and the tool body 86 are substantially coplanar after the part 76 has been fully consolidated. The length of the recess 88 corresponds to the length of the finished part 76.

The recess 88 defines a pair of oppositely facing shoulders 96 within the thickness of the walls 86a, 86b and 86c against which the ends of the part 76 may abut so as to prevent longitudinal movement of the part 76 relative to the tool body 84.

Although the tooling 84 has been described in connection with its use to form a relatively simple, U-section part of constant wall thickness, other configurations of the tool body 86 can be employed to fabricate other part shapes. For example, the recess 88 may possess surface features or a non-uniform depth in order to produce a part 76 having the same surface features or a non-uniform wall thickness. Furthermore, the tool body 86 may be curved along its length in order to produce parts 76 that are also curved along their length.

Figure 8:
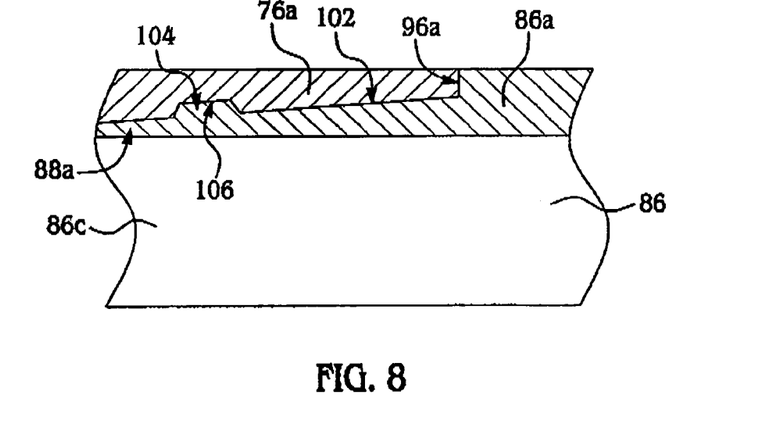
FIG. 8 is a side view illustration similar to FIG. 7 but showing an alternate form of a tooling recess.

FIG. 8 illustrates a tool body 86 with a recess 88a having a sloping bottom 102 that extends along at least a portion of the length of body 86. It should be noted however, that the depth of the recess 88a may also vary across the width and/or the length of the body 86. The recess 88a may have areas that are of either uniform and non-uniform depth, or both. The sloping bottom 102 creates a depth variation in the recess 88a which, during the consolidation process, causes the formation of a part 76a having a tapered wall thickness. The recess 88a may have tooling features such as the raised area 104 which produce corresponding shapes in the part 76a. In the example illustrated in FIG. 8, the raised area 104 forms a pocket 106 in a bottom surface of the part 76a.

Figure 6:
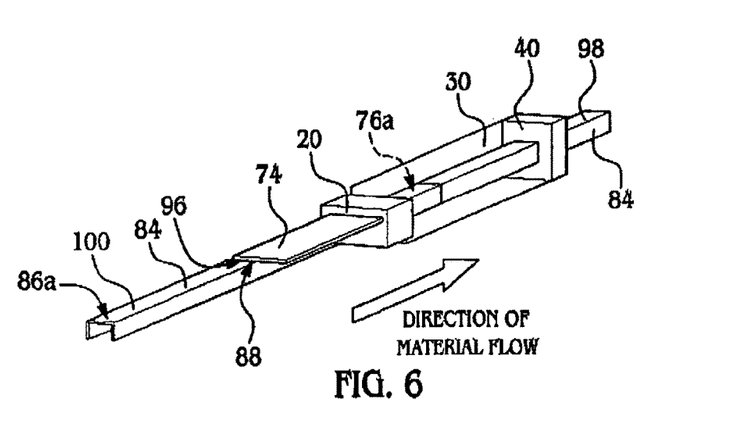
FIG. 6 is an illustration similar to FIG. 2 but showing the use of the tooling depicted in FIGS. 4 and 5.

In use, as best seen in FIG. 6, the tacked laminate plies 74 are placed within the recess 88 of the tool body 86, with the ends of the plies 74 engaging the shoulders 96 in the top wall 86a. The combination of the tool body 84 and the laminate plies 74 are fed into the pre-forming zone 20 where the laminate plies 74 are partially formed over exterior surfaces of the tool body 84, which in the illustrated embodiment, comprise the outside surfaces of the walls 86b, 86c. The leading end 98 of the tool body 84 enables the pulsating drive mechanism 40 to pull the tool body 84 along with the part 76 through the CCM line 10.

During the initial feed process, the leading end 98 of tool body 84 passes through the pulsating drive mechanism 40 just before the laminate plies 74 reach the pre-forming zone 20. In other words, the length of the leading end 98 of tool body 84 is such that the pulsating drive mechanism 40 is able to grasp the tool body 84, and begin advancing the tool body 84 before the laminate plies 74 actually reach the pre-forming zone 20. Although not specifically shown in FIGS. 2-7, mandrels (FIG. 1) comprising thin steel sheets may be applied to the non-tooled sides of the part 76.

As the pulsating drive mechanism 40 pulls the tool body 84 forwardly, the laminate plies 74 are pressed over the tool body 84 so as to pre-form the part, following which the preformed part, designated as 76a in FIG. 6 enters the consolidation operations 30 where the laminate plies are heated and compressed using the continuous compression molding techniques previously described. Pressing elements (not shown) in the consolidation station 30 bear against the mandrels 16 (FIG. 1) which apply pressure to the preformed part 76a until the part reaches the desired shape and is fully consolidated.

Continued movement of the tool body 84 carries the finished part 76 completely through the consolidation operations, with the trailing end 100 of tool body 84 remaining in the consolidation station 30 until the finished part 76 has completely emerged from the pulsating drive mechanism 40 and any other related processing equipment, and until the part 76 can be removed from the tool body 84. The trailing end 100 of the tool body 84 functions, in effect as a shim to maintain the alignment of the presses within the consolidation operations 30 until the part 76 completes the consolidation cycle. Because the trailing end 100 of the tool body 84 remains within the consolidation operations 30 until consolidation of the part 76 is complete, gaps within the press elements within the consolidation operations 30 remain constant, even as the trailing end of the finished part 76 emerges from the consolidation operations 30.

It can be appreciated that by using tooling 84 having a tool body 86 that has extended leading and trailing ends 98, 100, the scrap represented at 80, 82 shown in FIG. 3 is eliminated since these two scrap sections 80, 82 previously served a purpose similar to that of the leading and trailing ends 98, 100, having a respective length 94.

The tool body 84 may be constructed from any of various metals such as, but not limited to, stainless steel, and may be reused. The recess 88 in the tool body 86 may be created by machining the outer surface of the tool body 84 to a depth equal to the thickness of the consolidated laminate plies of the part 76.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A continuous compression molding fabrication line for performing a continuous process for forming a part using sheet members of composite material, the continuous compression molding fabrication line comprising:

a pre-forming zone configured to receive a plurality of sheet members of composite material, the pre-forming zone further configured to align and apply pressure to the sheet members to produce preformed sheet members;

a consolidation station configured to receive preformed sheet members from the preforming zone, the consolidation station comprising a heater that heats the preformed sheet members, followed by a plurality of tool dies individually mated with tool members having outer surfaces engaged by the plurality of tool dies and configured to compress heated preformed sheet members, followed by a cooling zone comprising a cooler configured to cool compressed heated preformed sheet members, and wherein the consolidation station has a first length through which the tooling is configured to pass during operation of the continuous compression molding fabrication line; and tooling around which the sheet members are attached, the tooling initially connected to the pre-forming zone, the tooling configured to be drawn through the pre-forming zone and then through the consolidation station, the tooling further configured to reduce an amount of material required to manufacture the part, wherein the tooling is configured to reduce the amount of material required to manufacture by having:

a body having first and second ends,
the body including a recessed area,
the first and second ends of the body extending beyond the recessed area; and
a second length of a portion of the second end extending beyond the recessed area being greater than or equal to the first length of the consolidation station through which the tooling is configured to pass during operation of the continuous compression molding fabrication line.

2. The continuous compression molding fabrication line of claim 1, wherein the recess defines first and second shoulders in the body for respectively engaging an end of the part.

3. The continuous compression molding fabrication line of claim 1, wherein the recess has a depth substantially equal to a thickness of the part.

4. The continuous compression molding fabrication line of claim 1, wherein the recess has a depth such that outer surfaces of the tooling are substantially coplanar with outer surfaces of the part.

5. The continuous compression molding fabrication line of claim 1, wherein the body has a cross-sectional shape generally matching the cross-sectional shape of the part.

6. The continuous compression molding fabrication line of claim 1, wherein the body is elongate and the recess is formed in the body between the first and second ends of the body.

7. The continuous compression molding fabrication line of claim 1, wherein the first and second ends of the body have an outer surface extending substantially coplanar with an outer surface of the part.

8. The continuous compression molding fabrication line of claim 1, wherein the recessed area has the general shape of a part and the part is carried in the recessed area.

9. The continuous compression molding fabrication line of claim 1, wherein the recessed area has a depth that varies in at least one direction across the recessed area.

10. The continuous compression molding fabrication line of claim 1, wherein the body includes tooling features within the recessed area for forming shapes in the part.

11. The continuous compression molding fabrication line of claim 1, wherein a third length of a portion of the first end of the tooling extending beyond the recessed area is greater than or equal to a distance between a pulsating drive mechanism and the pre-forming zone, wherein the pulsating drive mechanism is positioned downstream from the consolidation station.

12. A continuous compression molding fabrication line for performing a continuous process for forming a part using sheet members of composite material, the continuous compression molding fabrication line comprising:
a pre-forming zone configured to receive a plurality of sheet members of composite material, the pre-forming zone further configured to align and apply pressure to the sheet members to produce preformed sheet members;
a consolidation station configured to receive preformed sheet members from the preforming zone, the consolidation station comprising a heater that heats the preformed sheet members, followed by a plurality of tool dies individually mated with tool members having outer surfaces engaged by the plurality of tool dies and configured to compress heated preformed sheet members, followed by a cooling zone comprising a cooler configured to cool compressed heated preformed sheet members, and wherein the consolidation station has a first length through which the tooling is configured to pass during operation of the continuous compression molding fabrication line; and
tooling around which the sheet members are attached, the tooling initially connected to the pre-forming zone, the tooling configured to be drawn through the pre-forming zone and then through the consolidation station, the tooling further configured to reduce an amount of material required to manufacture the part, wherein the tooling is configured to reduce the amount of material required to manufacture by having:
a body having opposite first and second ends, the body being elongate,
the bony having at least one recess,
the first and second ends of the body extending respectively beyond opposite ends of the at least one recess and having outside surfaces forming an extension of a profile of the part when the plurality of sheet members is compressed into a shape of the part, and wherein a second length of a portion of the second end extending beyond the recessed area is greater than or equal to the first length of the consolidation station through which the tooling is configured to pass during operation of the continuous compression molding fabrication line.

13. The continuous compression molding fabrication line of claim 12, wherein the at least one recess has the general shape of the part and the plurality of sheet members are received within the at least one recess.

14. The continuous compression molding fabrication line of claim 12, wherein the at least one recess has a depth substantially equal to a thickness of the part.

15. The continuous compression molding fabrication line of claim 12, wherein the outside surfaces of the body are substantially coplanar with exterior surfaces of the part.

16. The continuous compression molding fabrication line of claim 12, wherein the at least one recess defines first and second shoulders in the body, and the first and second shoulders engage opposite ends of the part.

17. The continuous compression molding fabrication line of claim 12, wherein body has a cross-sectional shape generally matching the cross-sectional shape of the part.

18. The continuous compression molding fabrication line of claim 12, wherein a portion of the first end of the body extends beyond the at least one recess a distance sufficient such that at least portions of the first end of the body pass through the continuous compression molding fabrication line before the plurality of sheet members enters the continuous compression molding fabrication line.

19. The continuous compression molding fabrication line of claim 12, wherein a portion of the second end of the body extends beyond the at least one recess a distance sufficient such that at least portions of the second end of the body remain in the continuous compression molding fabrication line after the plurality of sheet members has passed through the molding line.

20. The continuous compression molding fabrication line of claim 12, wherein the at least one recess has a non-uniform depth.

21. The continuous compression molding fabrication line of claim 12, wherein the body includes tooling features within the at least one recess for forming shapes in the part.

22. The continuous compression molding fabrication line of claim 12, wherein a third length of a portion of the first end of the tooling is greater than or equal to a distance between a pulsating drive mechanism and the pre-forming zone, wherein the pulsating drive mechanism is positioned downstream from the consolidation station.

23. The continuous compression molding fabrication line of claim 12, wherein the body is rigid.

24. A continuous compression molding fabrication line for performing a continuous process for forming a part using sheet members of composite material, the continuous compression molding fabrication line comprising:
- a pre-forming zone configured to receive a plurality of sheet members of composite material, the pre-forming zone further configured to align and apply pressure to the sheet members to produce preformed sheet members;
- a consolidation station configured to receive preformed sheet members from the preforming zone, the consolidation station comprising a heater that heats the preformed sheet members, followed by a plurality of tool dies individually mated with tool members having outer surfaces engaged by the plurality of tool dies and configured to compress heated preformed sheet members, followed by a cooling zone comprising a cooler configured to cool compressed heated preformed sheet members, and wherein the consolidation station has a first length through which the tooling is configured to pass during operation of the continuous compression molding fabrication line; and
- tooling around which the sheet members are attached, the tooling initially connected to the pre-forming zone, the tooling configured to be drawn through the pre-forming zone and then through the consolidation station, the tooling further configured to reduce an amount of material required to manufacture the part, wherein the tooling is configured to reduce the amount of material required to manufacture by having:
- an elongate body having a leading end, a central section, and a trailing end, in which a portion of a second length of the leading end of the tool is greater than or equal to the first length; and
- at least one recess positioned within the central section.

* * * * *